No. 762,292. PATENTED JUNE 14, 1904.
C. L. EHART.
FEEDING MECHANISM FOR BALING PRESSES.
APPLICATION FILED FEB. 8, 1904.
NO MODEL. 2 SHEETS—SHEET 1.
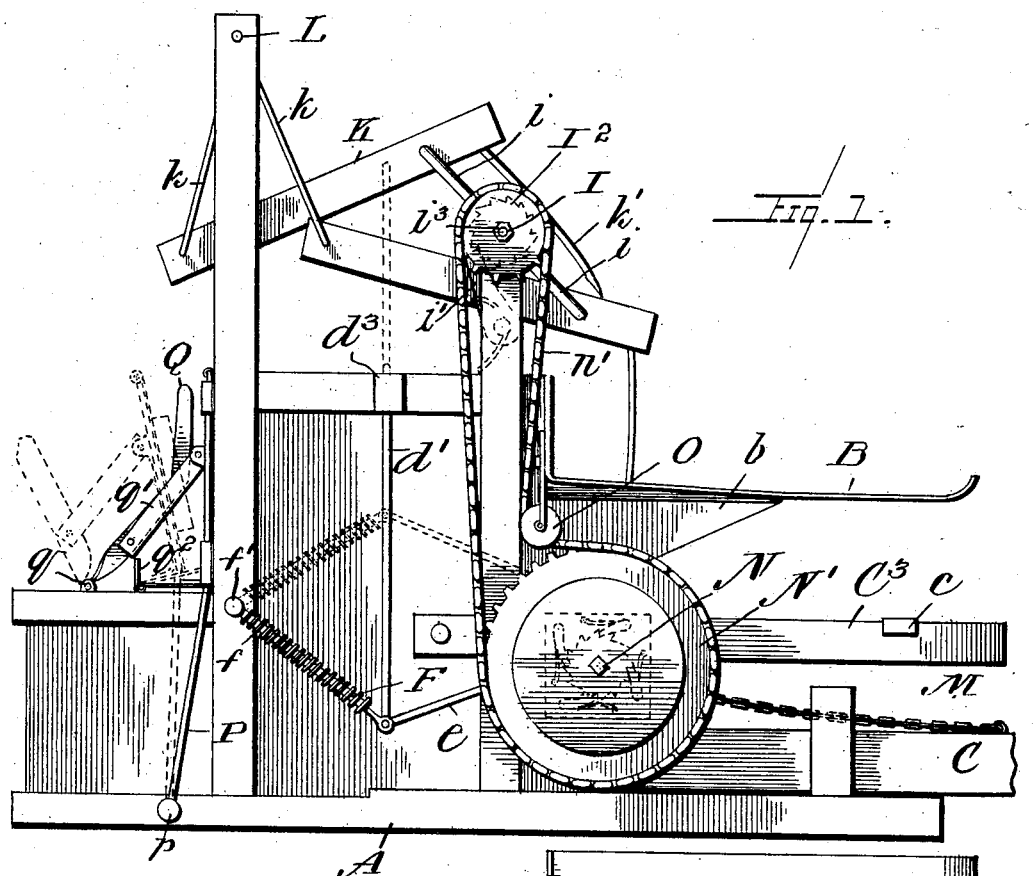
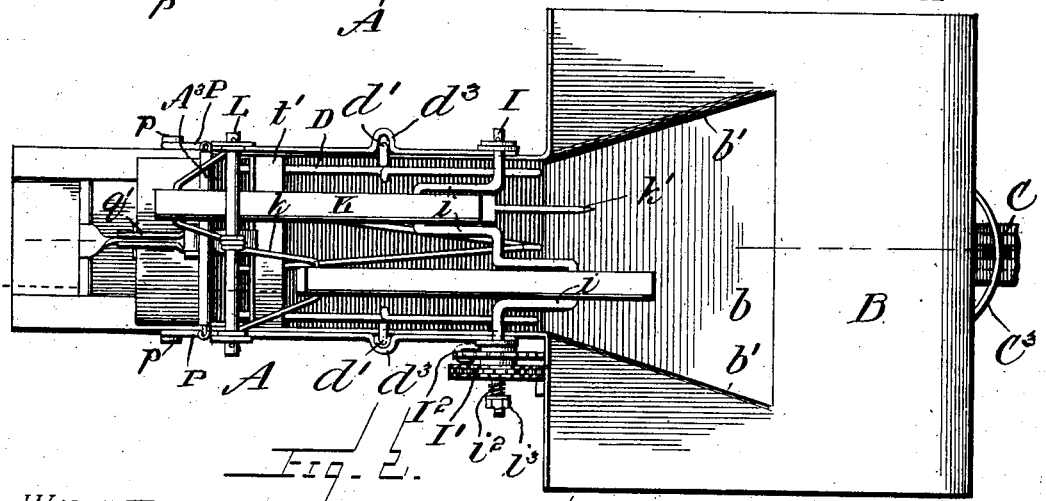
WITNESSES
INVENTOR
Charles L. Ehart
By Whitaker Prevost
Attorneys No. 762,292. PATENTED JUNE 14, 1904.
C. L. EHART.
FEEDING MECHANISM FOR BALING PRESSES.
APPLICATION FILED FEB. 8, 1904.
NO MODEL. 2 SHEETS—SHEET 2.
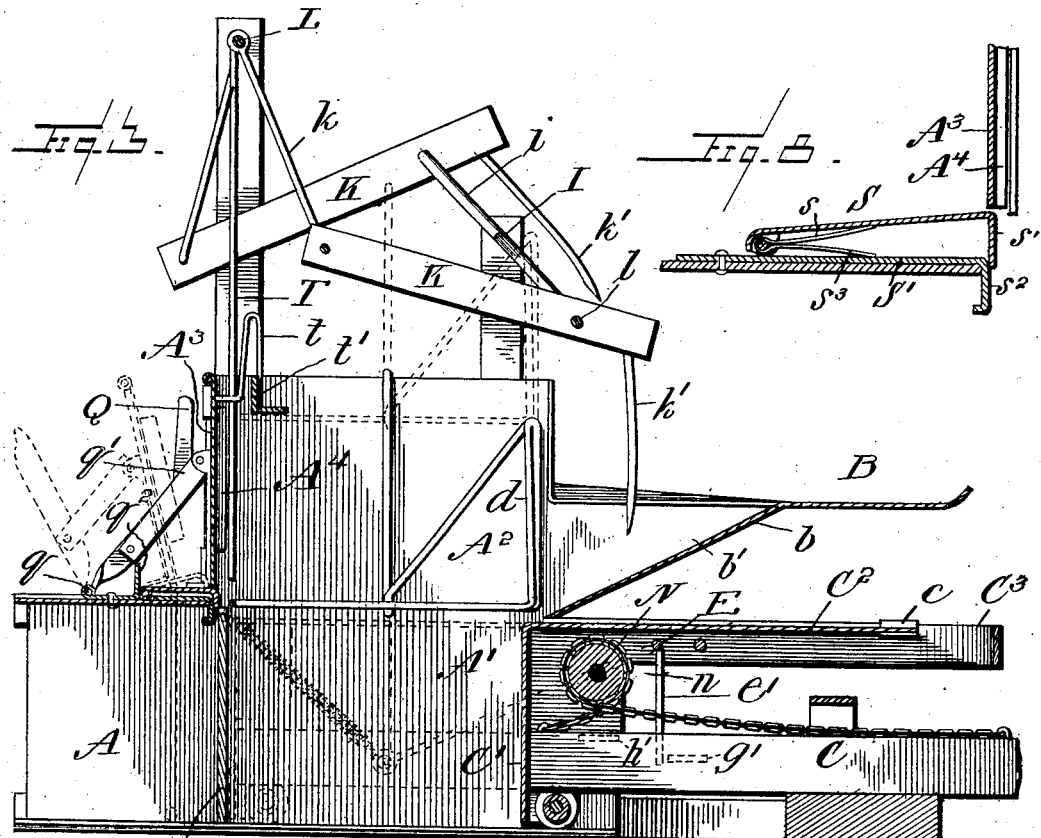
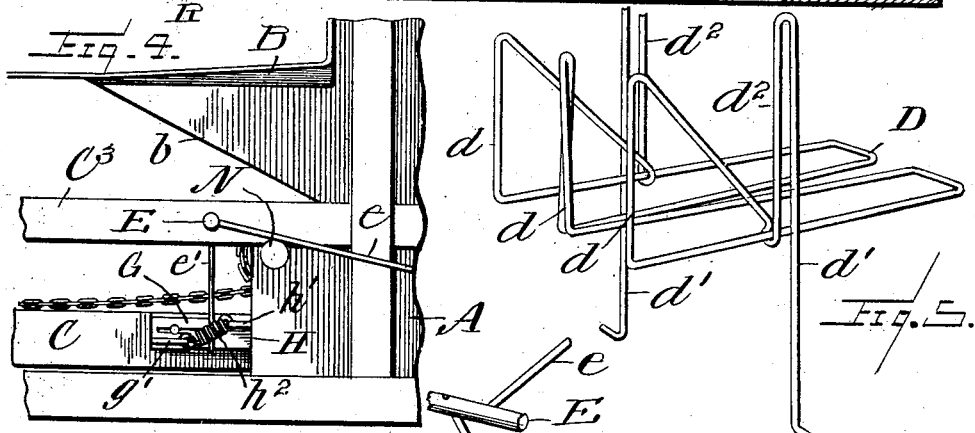
WITNESSES:
INVENTOR
Charles L. Ehart
BY
Whitaker Prewood Attorneys No. 762,292. Patented June 14, 1904.

UNITED STATES PATENT OFFICE.

CHARLES L. EHART, OF GRANVILLE, NORTH DAKOTA.

FEEDING MECHANISM FOR BALING-PRESSES.

SPECIFICATION forming part of Letters Patent No. 762,292, dated June 14, 1904.

Application filed February 8, 1904. Serial No. 192,643. (No model.)

*To all whom it may concern:*

Be it known that I, CHARLES L. EHART, a citizen of the United States, residing at Granville, in the county of McHenry and State of North Dakota, have invented certain new and useful Improvements in Feeding Mechanism for Baling-Presses; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form in which I have contemplated embodying my invention, and said invention is fully disclosed in the following description and claims.

Referring to said drawings, Figure 1 is a side elevation of a portion of a baling-press, showing my invention applied thereto. Fig. 2 is a top plan view of the same. Fig. 3 represents a central vertical longitudinal section of the structure illustrated in Fig. 1. Fig. 4 is a detail of part of the press, showing the means for raising and lowering the feeding-plunger. Fig. 5 is a detail view of one form of the feeding-plunger. Fig. 6 is a detail of parts shown in Fig. 4, drawn to an enlarged scale. Fig. 7 is a sectional view of the parts shown in Fig. 6, representing them in operative position. Fig. 8 is a detail view of the tucker and connected devices.

The improved baling-press feed mechanism herein shown and described may be used with any of the various forms of baling-press, and I have shown in the accompanying drawings so much of a baling-press as is necessary to illustrate my invention and its application thereto.

In the drawings, A represents a baling-press provided with a baling-chamber A', above which is the feeding-hopper $A^2$, preferably having its lateral walls on three sides in line with those of the baling-chamber A. On the fourth side or end the hopper is open, and adjacent thereto is located the feeding-table B above the baling-chamber and provided centrally with a downwardly-inclined chute or trough $b$, extending to the level of the top of the baling-chamber to facilitate the feeding of hay or straw to the hopper. This downwardly-inclined portion or chute is substantially the same width as the hopper $A^2$ at its lower end and increases in width toward the upper end, where it joins the horizontal part of the feeding-table, and the side walls $b'$ of said chute therefore converge toward the hopper and will compress the material fed along said chute as it passes therethrough on its way to the hopper.

C represents the baling-plunger provided with the head C', working in the baling-chamber, said head having a rearward extension $C^2$ from its upper edge in line with the top of the baling-chamber for the purpose of closing the upper part of said chamber and separating it from the hopper $A^2$ when the plunger is advanced. The outer end of the extension $C^2$ is provided with guides or supports $c$, which rest and slide upon a supporting-track $C^3$, and thus support said extension. The plunger may be reciprocated by any suitable or preferred means, which, as they form no part of my present invention, are not particularly described herein.

In the hopper $A^2$ is a vertically-reciprocating feeding-plunger D for the purpose of pressing down into the baling-chamber the material fed into the hopper during the forward movement of the plunger. This plunger D consists of a horizontally-disposed plate or frame fitting the hopper and provided with longitudinal slots or apertures to permit the passage therethrough of rake-arms, as hereinafter described. In the present instance I have shown the feeding-plunger D as formed of rods or bars, (see Fig. 5,) leaving longitudinal spaces between them; but it may be formed in other ways. On the front edge the plunger D is provided with upwardly-extending portions $d\ d$, separated to permit the rakes to pass between them and formed in this instance by bending the rods or bars upward, as shown in Fig. 5. These upwardly-extending portions form guards, which when the plunger D is in its lowest position cut off the feeding-table B from the hopper $A^2$ and prevent the material from crowding into the hopper above the feeding-plunger D when the latter is down.

The feeding-plunger D is provided, preferably, with two plunger-rods $d\ d$, one at each side, for raising and depressing the plunger. In this instance the plunger-rods $d'\ d'$ extend over the walls of the hopper $A^2$ and downward within the same, as shown at $d^2$, where they join the plunger proper, and the rods $d'\ d'$ are guided in their vertical movements by guiding sleeves or apertures $d^3\ d^3$ on the side walls of the hopper, as shown in Figs. 1 and 2. The lower ends of the plunger-rods $d'\ d'$ are each connected pivotally to an arm $e$, carried by a transverse rock-shaft E, mounted in the framework of the machine. The lower ends of the plunger-rods are also each pivoted to an extension or telescoping rod F, formed of two sections extensible longitudinally with respect to each other and provided with a spring $f$, engaging and normally tending to extend said sections. These extension-arms are pivoted to the framework of the press at $f'\ f'$ in a horizontal plane about midway between the highest and lowest positions of the lower ends of the plunger-rods $d'\ d'$. It follows from this construction that when the plunger is raised to its highest position the pressure of the springs $f\ f$ will be exerted upwardly to hold the plunger in its raised position, as shown in dotted lines, Fig. 1. When the plunger D descends, as soon as it has passed a median position the pressure of the springs will assist in forcing it downward with a quick movement to force the material in the hopper into the baling-chamber, as shown in full lines, Fig. 1.

The raising and depressing of the plunger D is effected from the plunger C, and in the drawings I have illustrated one form of mechanism for carrying this into effect. (See particularly Figs. 4 and 6.) In this mechanism the rock-shaft E is provided with a downwardly-extending trip-rod $e'$, which lies at one side of the plunger C. To the plunger C is secured a plate G (see Fig. 6) by means of screws or bolts passing through a slot $g$ in said plate so as to permit the said plate to slide longitudinally thereon with respect to the plunger. The plate G is provided with a lateral tripping projection $g'$ to engage the trip-rod $e'$ on the forward movement of plunger C, thereby rocking shaft E and lifting the feeding-plunger D to its highest position, where it will be held by the springs $f\ f$, as before described. During the further forward movement of the plunger the trip projection $g'$ will pass under trip-arm $e'$.

H represents a similar plate to the plate G, also slotted at $h$ and secured to the plunger C by screws or bolts so as to permit it to move slightly in a direction opposite to the movement of the plate G. The same bolts or screws may be used to hold both of these plates in position on the plunger C, one plate overlying the other. The plate H is provided with a trip projection $h'$ on a higher plane than the projection $g'$ to engage the trip-rod $e'$ on the return stroke of the plunger C, and thereby depress the feeding-plunger D.

$h^2$ represents a spring which connects the plates G and H and is conveniently connected to the trip projections $g'\ h'$ for the purpose of cushioning the contact of said trip projections with the trip-arm $e'$ by permitting one or the other of said plates G or H to yield slightly, so as to prevent straining the parts.

Above the hopper $A^2$ is a transverse crank-shaft I, supported in suitable bearings and provided with a number of cranks $i$, (two being shown,) each carrying a rake-bar K, the rear end of which is pivotally and movably supported by a link or hanger $k$ from a transverse supporting-shaft L, secured above the rear portion of the hopper $A^2$. Each of said rake-bars is provided with one or more rake-teeth $k'$, adapted when the crank-shaft I is rotated to rake the material on the table B downward through the chute $b$ into the hopper beneath the plunger D. Mechanism is provided for actuating the crank-shaft I during the rearward movement of the baling-plunger C and for permitting it to remain stationary during the outward movement of said plunger. To this end the plunger C is provided with a chain M or other flexible connection, having its ends connected to the plunger adjacent to the opposite extremities thereof and having its central portion coiled around and secured at one point rigidly to a drum $n$ on a shaft N, extending across the machine, and provided at one side thereof with a driving sprocket-wheel N', connected to the shaft by means of a ratchet-and-pawl mechanism, (illustrated in dotted lines in Fig. 1,) so that the wheel N' will be rotated in one direction only by the shaft. As the plunger is moved longitudinally in one direction or the other one portion of the chain will be drawn taut and will cause the drum $n$ and shaft N to rotate, the other or slack portion of the chain being wound upon the drum as the taut portion is unwound therefrom. The sprocket-wheel N' is connected by a chain $n'$ to a smaller sprocket-wheel I' on the crank-shaft I, said sprocket being loose on the shaft. The crank-shaft I is also provided with a ratchet-wheel $I^2$, keyed thereto, and the pawl $i'$ is provided to prevent it from being turned backward. The sprocket-wheel I' is connected to the crank-shaft I by friction, and in this instance the ratchet-wheel $I^2$ and sprocket-wheel I' are provided with engaged friction-surfaces and are held in frictional contact by a spring $i^2$, surrounding the crank-shaft, said spring being adjusted by a nut $i^3$ to vary its tension. It will be obvious from this construction that when the plunger C is moved rearwardly the sprocket-wheels N' I' will be rotated and motion will be imparted to the crank-shaft I and the rake-bars K K, the teeth of which, as before described, operate between open portions of the feeding-plunger D and carry the material into the hopper. In case the teeth of the rakes carry sufficient material into the hopper to create a greater pressure or resistance to their movement than the frictional resistance of the bearing between the sprocket-wheel I' and ratchet-wheel I² will warrant the friction connection will slip and the rakes will cease to operate, thus preventing the hopper from being packed too tightly and also preventing the breaking of the rakes or straining of the mechanism connected therewith. By adjusting the friction between the wheels I' and I² (by adjusting-spring $i^2$) the quantity of material fed into the hopper may be practically controlled, as the rakes will always stop when enough material has been packed into the hopper to cause resistance to their movement sufficient to overcome the friction of the driving mechanism.

O represents an idle roller for keeping the sprocket-chain taut, which is preferably made adjustable in any desired manner.

I also provide means for introducing the division-boards into the baling-chamber. In order to provide for this, I make the rear wall A³ of the hopper A² (in this case opposite the feeding-table) separate from the side walls and support the same by means of vertically-disposed arms P P, which extend below and slightly in rear of the said rear wall and are pivoted at $p$ on opposite sides of the machine.

Q represents a bent or curved lever pivoted at $q$ on top of an extension of the baling-chamber and connected by links $q'$ $q'$ to the pivotally-mounted rear wall A³, which thus forms a door. The lever Q is of such form that when the rear wall A³ is in closed position the links $q'$ will be in a direct line with the point of pivoting of said lever, as shown in Figs. 1 and 3 in full lines, and hence pressure upon the said rear wall from the interior of the hopper will be transmitted directly to the pivotal point $q$. When the lever Q is drawn back, the rear wall will swing backward on the pivots $p$ $p$ to permit the insertion of the division-board, as shown in dotted lines, Figs. 1 and 3. A stop $q^2$ limits the opening movement of the door or rear wall. The said door or rear wall of the hopper is provided with lateral guides A⁴ to guide the division-board R when placed in engagement therewith.

S' represents a tucker consisting of a vertically-movable plate secured to the extension of the baling-chamber and having a downwardly and rearwardly bent portion $s^2$ extending below the top of the baling-chamber. This tucker can yield upwardly against the action of a spring $s^3$ and assists the passage of the material into the extension of the baling-chamber and prevents it from catching on the top edge thereof. Above the tucker S' is a pivoted plate S, engaged by a spring $s$ and provided with a downwardly-turned guard $s'$ for preventing trash from accumulating above the tucker-plate and interfering with the operation of the tucker. This guard closes the opening below the hinged door A³ and forms a protected recess into which the tucker may pass when pressed upward.

In inserting a division-board the lever Q is drawn back to open the door or rear wall A³ and the board R is placed in position between the guides A⁴ A⁴ with its lower end resting upon the spring-plate S. The lever is then thrown forward to force the door A³ back into vertical or closed position, and the division-board will be retained temporarily in this position. In order to prevent the board R from falling, I provide a vertical guide rod or bar T, pivoted on the shaft L and extending downwardly in position to hold the board R against the door A³ by a spring $t$, secured to a cross-bar $t'$, connected to the hopper A².

The construction of the feeding-plunger D is such that when it is in raised position (at which time the division-boards are inserted) its rear edge will overlie the division-board when held in position upon the rear wall or door A³, as previously described. When, therefore, the plunger is depressed, as before described, the division-board will be carried down with it into the baling-chamber, as shown in Fig. 3.

It will thus be seen that in operating a press equipped with my improved feeding device the material to be compressed into bales is deposited upon the feeding-table B in any desired manner. On the forward stroke of the baling-plunger the feeding-plunger D is raised and the feeding-rakes will automatically feed the material into the hopper beneath the plunger D until the material is compressed sufficiently to stop the rakes. When the baling-plunger returns, and thus opens the baling-chamber, the plunger D is depressed, carrying down into the baling-chamber the material in the hopper and cutting off the communication between the chute $b$ and the hopper until the plunger D is again raised by the operation of the baling-plunger C, when the operation is repeated.

It is to be understood that I do not limit myself to the exact details of construction herein shown and described, as the same may be varied without departing from the spirit of my invention.

What I claim, and desire to secure by Letters Patent, is—

1. The combination with a baling-press provided with a baling-chamber, and a baling-plunger working therein, of a hopper above the baling-chamber, a feeding-table adjacent to said hopper, a feeding-plunger working in said hopper, in a direction perpendicular to the travel of the baling-plunger, movable feeding devices for feeding the material from the feeding-table to said hopper, mechanism operated by the baling-plunger for raising and depressing said feeding-plunger, and a yielding device for holding the feeding-plunger in a raised position, substantially as described.

2. The combination with a baling-press provided with a baling-chamber, and a baling-plunger working therein, of a hopper above the baling-chamber, a feeding-table adjacent to said hopper, a feeding-plunger working in said hopper, in a direction perpendicular to the travel of the baling-plunger, movable feeding devices for feeding the material from the feeding-table to said hopper, mechanism operated by the baling-plunger for raising and depressing said feeding-plunger, a spring-actuated device connected to said feeding-plunger at one end and having its other end connected to a stationary part in a position between the upper and lower positions to which its movable end is raised, whereby said device will hold the feeding-plunger in raised position, and will assist in depressing it when moved downward past a median position, substantially as described.

3. The combination with a baling-press provided with a baling-chamber, and a baling-plunger working therein, of a hopper above the baling-chamber, a feeding-table adjacent to said hopper, a feeding-plunger working in said hopper, in a direction perpendicular to the travel of the baling-plunger, movable feeding devices for feeding the material from the feeding-table to said hopper, mechanism operated by the baling-plunger for raising and depressing said feeding-plunger, a telescoping spring-actuated rod pivotally connected at one end to the feeding-plunger and having its other end pivoted to a stationary part in a line between the upper and lower positions of its movable end, whereby the pressure of the spring will be utilized both for holding the feeding-plunger in raised position and for assisting in depressing the feeding-plunger when the latter is moved downward beyond a median position, substantially as described.

4. The combination with a baling-press provided with a baling-chamber, and a baling-plunger working therein, of a hopper above the baling-chamber, a feeding-table adjacent to said hopper, a feeding-plunger working in said hopper, in a direction perpendicular to the travel of the baling-plunger, movable feeding devices for feeding the material from the feeding-table to said hopper, mechanism operated by the baling-plunger for raising and depressing said feeding-plunger including a trip-bar, and trip projections upon the feeding-plunger, adapted to engage said trip-bar, substantially as described.

5. The combination with a baling-press provided with a baling-chamber, and a baling-plunger working therein, of a hopper above the baling-chamber, a feeding-table adjacent to said hopper, a feeding-plunger working in said hopper, in a direction perpendicular to the travel of the baling-plunger, movable feeding devices for feeding the material from the feeding-table to said hopper, mechanism operated by the baling-plunger for raising and depressing said feeding-plunger including a rock-shaft operatively connected to said feeding-plunger, a trip-bar connected to said rock-shaft, and spring-actuated trip projections in different vertical and horizontal planes operatively connected with the feeding-plunger, substantially as described.

6. The combination with a baling-press provided with a baling-chamber, and a baling-plunger working therein, of a hopper above the baling-chamber, a feeding-table adjacent to said hopper, a feeding-plunger working in said hopper in a direction perpendicular to the travel of the baling-plunger, movable feeding devices for feeding the material from the feeding-table to said hopper, mechanism operated by the baling-plunger for raising and depressing said feeding-plunger including a rock-shaft operatively connected to said feeding-plunger, a trip-bar connected to said rock-shaft, a pair of slotted plates movably connected to said baling-plunger by devices passing through the slots thereof and provided with trip projections for engaging said trip-bar, and a spring connected to said plates to permit them to yield longitudinally with respect to the baling-plunger, substantially as described.

7. In a baling-press, the combination with a baling-chamber and a baling-plunger located therein, of a hopper above said baling-chamber, a feeding-table located adjacent thereto and provided with a tapering chute communicating with said hopper, movable feeding devices for transferring the material from said table through said chute to the hopper, and a vertically-movable feeding-plunger in said hopper, provided with apertures to accommodate said feeding devices, substantially as described.

8. In a baling-press, the combination with a baling-chamber and a baling-plunger located therein, of a hopper above said baling-chamber, a feeding-table located adjacent thereto and provided with a tapering chute communicating with said hopper, movable feeding devices for transferring the material from said table through said chute to the hopper, and a vertically-movable feeding-plunger in said hopper provided with vertically-disposed portions for cutting off communication between the hopper and feeding-chute when the said feeding-plunger is moved toward the baling-chamber, substantially as described.

9. The combination with a baling-press provided with a baling-chamber and a baling-plunger working therein, of a hopper adjacent to and communicating with the baling-chamber, a feeding-table adjacent to said hopper, and a reciprocating feeding-plunger in said hopper, provided with devices for cutting off communication between the hopper and said feeding-table when the feeding-plunger is moved toward the baling-chamber, substantially as described.

10. The combination with a baling-press provided with a baling-chamber, and a baling-plunger working therein, of the hopper, a feeding-table communicating therewith, movable rakes for feeding the material from the table into said hopper, a driving-shaft for said rakes, a friction device connected therewith, driving mechanism for said rakes operated by said baling-plunger and connected to said friction device, substantially as described.

11. The combination with a baling-press provided with a baling-chamber, and a baling-plunger working therein, of the hopper, a feeding-table communicating therewith, movable rakes, for feeding the material from the table into said hopper, a driving-shaft for said rakes, a friction device connected therewith, driving mechanism for said rakes operated by said baling-plunger and connected to said friction device, and mechanism for adjusting said friction device to regulate the amount of material fed into said hopper, substantially as described.

12. The combination with a baling-press provided with a baling-chamber and a baling-plunger working therein, of a hopper located adjacent to the baling-chamber and having a movable wall or door provided with means for receiving a division-board, a self-locking lever for opening and closing said door, a feeding-plunger in said hopper, movable toward and from the baling-chamber and adapted to force the division-board into the latter, substantially as described.

13. The combination with a baling-press provided with a baling-chamber and a baling-plunger working therein, of a hopper located adjacent to the baling-chamber and having a movable wall or door provided with means for receiving a division-board, a self-locking lever for opening and closing said door, a feeding-plunger in said hopper movable toward and from the baling-chamber and adapted to force the division-board into the latter, and a yielding support for the division-board, substantially as described.

14. The combination with a baling-press provided with a baling-chamber and a baling-plunger working therein, of a hopper located adjacent to the baling-chamber and having a movable wall or door provided with means for receiving a division-board, a self-locking lever for opening and closing said door, a feeding-plunger in said hopper, movable toward and from the baling-chamber and adapted to force the division-board into the latter, and a yielding support for the said division-board, located in the hopper and holding said board between it and said door, substantially as described.

15. The combination with a baling-press provided with a baling-chamber and a baling-plunger working therein, of a hopper located adjacent to the baling-chamber and having a movable wall or door provided with means for receiving a division-board, a self-locking lever for opening and closing said door, a feeding-plunger in said hopper, movable toward and from the baling-chamber and adapted to force the division-board into the latter, and a spring-actuated pressure-bar for holding the division-board in engagement with said door, substantially as described.

In testimony whereof I affix my signature in the presence of two witnesses.

CHARLES L. EHART.

Witnesses:
H. K. SMITH,
W. J. MALONEY.